(12) United States Patent (10) Patent No.: US 7,529,845 B2
Liu (45) Date of Patent: May 5, 2009

(54) COMPRESSING, FILTERING, AND TRANSMITTING OF PROTOCOL MESSAGES VIA A PROTOCOL-AWARE INTERMEDIARY NODE

(75) Inventor: Zhigang Liu, Coppell, TX (US)

(73) Assignee: Nokia Corporation, Espoo (FI)

( * ) Notice: Subject to any disclaimer, the term of this patent is extended or adjusted under 35 U.S.C. 154(b) by 788 days.

(21) Appl. No.: 10/991,983

(22) Filed: Nov. 19, 2004

(65) Prior Publication Data
US 2006/0075132 A1 Apr. 6, 2006

Related U.S. Application Data

(60) Provisional application No. 60/609,871, filed on Sep. 15, 2004.

(51) Int. Cl.
*G06F 15/16* (2006.01)
(52) U.S. Cl. .................. 709/230; 370/389
(58) Field of Classification Search ......... 709/200–202, 709/230–231; 370/389, 477
See application file for complete search history.

(56) References Cited

U.S. PATENT DOCUMENTS

| 5,627,829 | A | 5/1997 | Gleeson et al. | |
| 2004/0022252 | A1* | 2/2004 | Jang et al. | 370/395.52 |
| 2005/0041660 | A1* | 2/2005 | Pennec et al. | 370/389 |

FOREIGN PATENT DOCUMENTS

WO WO2004/017597 2/2004

OTHER PUBLICATIONS

Jian Jun Wu, et al., "Light weight SIP/SDP Compression Scheme (LSSCS)" XP-008005555, 2001, pp. 67-76.
P. Srisuresh, et al., "Middlebox communication architecture and framework", Aug. 2002, pp. 1-35.
C. Huitema, "Real Time Control Protocol (RTCP) Attribute in Session Description Protocol (SDP)", Network Working Group, RFC 3605, Oct. 2003, pp. 1-8.
Hannu et al, "Signaling Compression (SigComp)—Extended Operations", Network Working Group, RFC 3321, Jan. 2003, pp. 1-8.
Price et al, "Signaling Compression (SigComp)", Network Working Group, RFC 3320, Jan. 2003, pp. 1-58.
Rosenberg et al, "An Offer/Answer Model with the Session Description Protocol (SDP)", Network Working Group, RFC 3264, Jun. 2002, pp. 1-24.

(Continued)

*Primary Examiner*—Moustafa M Meky
(74) *Attorney, Agent, or Firm*—Squire, Sanders & Dempsey L.L.P.

(57) ABSTRACT

Methods, apparatuses, and a system for compressing, filtering, and transmitting of protocol messages to be transmitted from a transmitting side via a protocol-aware intermediary node to a receiving side, the compressing method comprising the steps of: detecting a type of a protocol message to be compressed; and selectively compressing, based on the detected message type, certain predefined parts of the protocol message and leaving other predefined parts of the protocol message uncompressed; and the filtering method, if it is retrieved that the protocol message is not fully compressed, comprising the steps of: detecting a type of the protocol message to be filtered; scanning the message; and selectively processing, based on the detected message type and the scanning, certain predefined parts of the protocol message and leaving other predefined parts of the protocol message unprocessed.

54 Claims, 8 Drawing Sheets

OTHER PUBLICATIONS

Rosenberg et al, "SIP: Session Initiation Protocol", Network Working Group, RFC 3261, Jun. 2002, pp. 1-252.
Handley et al, "SDP: Session Description Protocol", Network Working Group, RFC 2327, Apr. 1998, pp. 1-40.
3GPP TS 24.228 V5.8.0 (Mar. 2004), Technical Specification, 3rd Generation Partnership Project; Technical Specification Group Core Network; Signalling Flows for the IP multimedia call control based on SIP and SDP; Stage 3 (Release 5), 2004, pp. 1-842.

* cited by examiner

COMPRESSING, FILTERING, AND TRANSMITTING OF PROTOCOL MESSAGES VIA A PROTOCOL-AWARE INTERMEDIARY NODE

This nonprovisional application claims the benefit of U.S. Provisional Application No. 60/609,871, filed Sep. 15, 2004. The disclosure of the prior application is hereby incorporated by reference herein in its entirety.

FIELD OF THE INVENTION

The present invention relates to methods, apparatuses and a system for compressing, filtering, and transmitting of protocol messages to be transmitted from a transmitting side via a protocol-aware intermediary node to a receiving side. In particular, the present invention relates to protocol messages of an application layer protocol such as, for example, the Session Initiation Protocol (SIP).

BACKGROUND OF THE INVENTION

In recent years, communication technology has widely spread in terms of number of users and amount of use of the telecommunication services by the users. This also led to an increase in the number of different technologies and technological concepts in use.

A communication between two communication units is therefore not easy to accomplish, in particular when the communication units are of different technologies or belong to different parts of the overall communication system. The ISO/OSI (International Standards Organization's Open System Interconnect) reference model defines seven layers with respective tasks and interfaces for facilitating a universal communication between any two communication units supporting the reference model. A suite of protocols to be used in multiple layers of the model is usually called a protocol stack, such as e.g. the Internet Protocol (IP) stack. The ISO/OSI reference model has become a generally accepted standard model.

For example, the task of the highest layer, i.e. the application layer, is the provision of application-oriented basic services with respective data structures and protocols. Such basic services of the application layer are creation, establishment, modification, and termination of so-called sessions between communication units. A session in this sense is a logical association between communicating units, which builds a basis for an exchange of data. Examples for such sessions in present-day communication systems may include Internet telephony calls by means of a voice-over-IP (VoIP) service, wherein IP stands for any version of an Internet Protocol, multimedia distribution, and multimedia conferences.

A protocol of the application layer, which is designed for performing signaling tasks concerning the creation, establishment, modification, and termination of sessions, is the Session Initiation Protocol (SIP), for example. As aspects of the SIP protocol a determination of a user location, a determination of a user availability, a determination of user capabilities, a session setup, and a session management can be mentioned. SIP is defined in RFC 3261 of the Internet Engineering Task Force (IETF), and has been selected by the Third-Generation Partnership Project (3GPP) as the signaling protocol for IP multimedia subsystems (IMS). An IMS is a multimedia-oriented extension of the functionality of existing communication systems such as, for example, the Global System for Mobile communication (GSM), the General Packet Radio Service (GPRS), or the Universal Mobile Telecommunication System (UMTS).

When applied in a mobile communication environment, a session setup time will have to be reduced as compared with fixed networks in order to be acceptable to mobile users. For this purpose, a technique called SigComp (Signaling Compression) has been developed, which is defined in RFCs 3320 and 3321 of the IETF. SigComp thus is a known solution for compressing signaling messages generated by application layer protocols such as the Session Initiation Protocol (SIP) or the Real-Time Streaming Protocol (RTSP). When applied to SIP, for example the transmission latency of SIP messages over bandwidth-limited links such as (cellular) radio links can be reduced. A support for SigComp has also been required in the Third-Generation Partnership Project (3GPP).

A further aspect in modern and future communication systems resides in the provision of security both for single users and their individual communications as well as for entire subsystems.

For this purpose, intermediary nodes are usually used as network elements for building a single and secure access interface between certain parts of the system. For example, between a private and/or local area network and the rest of the Internet. Such an intermediary node is normally referred to as a firewall (FW). An intermediary node or firewall is thus located on the communication path from a transmitting side to a receiving side when the two sides reside in distinct subsystems. The communication on the path is analyzed by the intermediary node or firewall with respect to security aspects such as user integrity and/or authorization. If the communication from the transmitting side (i.e. single messages) is determined to be permissible/secure, it is relayed to the receiving side, otherwise it is rejected/dropped.

A specific type of firewall is a protocol-aware firewall. Such a protocol-aware firewall "has" a certain knowledge about the protocol for which it is designed. Therefore, it is particularly suitable for analyzing messages according to such a specific protocol. As an example in accordance with the above-mentioned SIP protocol, there exist SIP-aware firewalls. Such SIP-aware firewalls can filter and/or parse as well as analyze SIP messages—mainly the SDP (Session Description Protocol, specified in RFC 2327 of IETF) protocol data carried in a payload section of the SIP message—to retrieve the transport information for a session between the transmitting side and the receiving side. This allows the firewall to dynamically perform configurations, e.g. to set up so-called pinholes, so that the data packets (e.g. VoIP RTP packets) for the session are enabled to pass through the firewall.

However, there arises a problem when the protocol messages to be transmitted via a protocol-aware intermediary node are compressed in some way, for example by SigComp.

As described above, the protocol-aware firewall needs to parse incoming protocol messages e.g. in order to find the transport information for a SIP session and to configure pinholes accordingly. However, when protocol messages such as SIP messages are compressed, the firewall will not have access to the original message. This will prevent the firewall from opening/configuring pinholes for the session, and thus leads to a rejection of the message, and therewith a rejection of media and/or data packets, by the firewall.

In prior art, there has not yet been proposed a feasible solution for this problem, in particular in a mobile communication environment.

A possible solution would, for example, be not to apply a compression of protocol messages. However, this is not feasible for a low-bandwidth air interface like in present mobile communication systems. Without a compression, the transmission delay will be too large to be acceptable to mobile end users.

Another conceivable solution is to add decompression functionality to the protocol-aware firewall. The firewall would then decompress each compressed protocol message and then extract the transport information, if it is carried in the protocol message. However, this will add significant complexity to the firewall. First, it would need to implement decompression functionality such as Sigcomp functionality. Second, it would also require some functions of the application layer and the SIP protocol itself as well as, in case of SIP over TCP (Transmission Control Protocol), almost the entire TCP stack. Another problematic question in this regard concerns scalability issues.

A further type of solution is not to use a protocol-aware firewall. However, that means that the firewall has to rely on some other means to acquire the necessary transport information of a session. For example, by explicit signaling sent to the firewall from an application entity (e.g. SIP client, SIP proxy, or a third party entity). Such a solution is currently being studied by the IETF. However, there are two problems with this solution. First, though already needed today, it is not yet available or even ready for implementation, and presumably a lot of time will still pass for development and standardization of such a mechanism. Second and mainly, such a solution requires changes to the overall system architecture. This will result in high costs and efforts for its implementation.

Thus, a solution to the above problems and drawbacks is needed for providing for an efficient protocol message transfer via a protocol-aware intermediary node.

SUMMARY OF THE INVENTION

Consequently, it is an object of the present invention to remove the above drawbacks inherent to the prior art. Hence, it is an object of the present invention to provide methods, apparatuses, and a system, which are improved in this regard.

According to a first aspect of the invention, this object is for example achieved by a method of compressing protocol messages to be transmitted from a transmitting side via a protocol-aware intermediary node to a receiving side, wherein protocol messages comprise a header section and optionally a payload section, each of which being composed of a plurality of predefined parts, the method comprising the steps of: detecting a type of a protocol message to be compressed; and selectively compressing, based on the detected message type, certain predefined parts of the protocol message and leaving other predefined parts of the protocol message uncompressed.

According to further advantageous developments:
the step of detecting a message type comprises an analyzing whether the protocol message contains a payload section or not;
the step of compressing compresses all parts of the protocol message, if it is detected that the message does not contain a payload section and is not of a predetermined message type;
the step of compressing leaves uncompressed those predefined parts of the protocol message, which contain information on the basis of which the protocol-aware intermediary node performs configurations for enabling data packets of a session associated with the protocol message to be transmitted from the transmitting side to the receiving side;
the step of compressing leaves uncompressed at least one predefined part being indicative of the type of the message;
the step of compressing leaves uncompressed at least one predefined part indicative of information for capturing a response to the protocol message;
the step of compressing leaves uncompressed at least one predefined part being indicative of establishment information of a session between the transmitting side and the receiving side, to which the message belongs;
the step of compressing leaves uncompressed at least one predefined part being indicative of a type of a payload section of the protocol message;
the step of compressing leaves uncompressed at least one predefined part being indicative of an identification of a session between the transmitting side and the receiving side, to which the message belongs;
the step of compressing leaves uncompressed at least one predefined part being indicative of information relating to a logical association between the transmitting side and the receiving side;
the step of compressing leaves uncompressed at least one predefined part being indicative of information relating to a transport of data between the transmitting side and the receiving side;
the step of compressing leaves uncompressed at least one predefined part being indicative of attributes relating to a transmission intention of the transmitting side;
the step of compressing leaves uncompressed separation markings before and after specific predefined parts;
the protocol message is a message of an application layer protocol according to an ISO/OSI reference model;
the protocol message is a message of a session initiation protocol (SIP);
the payload section is of payload in accordance with a session description protocol (SDP); and
the step of compressing operates in accordance with a signaling compression (Sigcomp) technique.

According to a second aspect of the invention, this object is for example achieved by a method of filtering protocol messages to be transmitted from a transmitting side via a protocol-aware intermediary node to a receiving side, wherein protocol messages comprise a header section and optionally a payload section, each of which being composed of a plurality of predefined parts, the method comprising the step of: retrieving a compressing status of a protocol message to be filtered, said compressing status being indicative of the protocol message being fully compressed or not; and if it is retrieved that the protocol message is fully compressed, the protocol message is relayed; and if it is retrieved that the protocol message is not fully compressed, the method further comprises the steps of: detecting a type of the protocol message to be filtered; scanning of the protocol message for identifying compressed and uncompressed predefined parts of the protocol message; and selectively processing, based on the detected message type and the scanning, certain predefined parts of the protocol message and leaving other predefined parts of the protocol message unprocessed.

According to further advantageous developments:
the step of detecting a message type comprises an analyzing whether the protocol message contains a payload section or not;
the step of processing comprises an extracting of information from those uncompressed predefined parts of the protocol message, which contain information on the basis of which the protocol-aware intermediary node performs configurations for enabling data packets of a session associated with the protocol message to be transmitted from the transmitting side to the receiving side;

the step of processing comprises an extracting of information being indicative for capturing a response to the protocol message;

the step of processing comprises an extracting of information being indicative of an establishment of a session between the transmitting side and the receiving side, to which the message belongs;

the step of processing comprises an extracting of information being indicative of a type of a payload section of the protocol message;

the step of processing comprises an extracting of information being indicative of an identification of a session between the transmitting side and the receiving side, to which the message belongs;

the step of processing comprises an extracting of information being indicative of a logical association between the transmitting side and the receiving side;

the step of processing comprises an extracting of information being indicative of a transport of data between the transmitting side and the receiving side;

the step of processing comprises an extracting of information being indicative of attributes relating to a transmission intention of the transmitting side;

the method further comprises a step of performing configurations for enabling the data packets to be transmitted between the transmitting side and the receiving side;

the step of performing configurations is carried out at the protocol-aware intermediary node, and is based on information being extracted from the protocol message to be filtered;

the step of performing configurations comprises a step of setting up at least one pinhole for a session between the transmitting side and the receiving side, to which the message belongs;

the protocol message is a message of an application layer protocol according to a ISO/OSI reference model;

the protocol message is a message of a session initiation protocol (SIP);

the payload section is of payload in accordance with a session description protocol (SDP); and the compressed predefined parts of the protocol message are compressed in accordance with a signaling compression (SigComp) technique.

According to a third aspect of the invention, this object is for example achieved by a method of transmitting protocol messages to be transmitted from a transmitting side via a protocol-aware intermediary node to a receiving side, wherein protocol messages comprise a header section and optionally a payload section, each of which being composed of a plurality of predefined parts, the method comprising the steps of: compressing, at a compressor, a protocol message to be transmitted in accordance with a compressing method according to the first aspect; and filtering, at the protocol-aware intermediary node, the protocol message in accordance with a filtering method according to the second aspect.

According to a fourth aspect of the invention, this object is for example achieved by a compressor for compressing protocol messages to be transmitted from a transmitting side via a protocol-aware intermediary node to a receiving side, wherein protocol messages comprise a header section and optionally a payload section, each of which being composed of a plurality of predefined parts, the compressor comprising: detecting means for detecting a type of a protocol message to be compressed; and compressing means for selectively compressing, based on the detected message type, certain predefined parts of the protocol message and leaving other predefined parts of the protocol message uncompressed.

According to further advantageous developments:

the detecting means is further configured for analyzing whether the protocol message contains a payload section or nor;

the compressing means is further configured for compressing all parts of the protocol message, if the detecting means yields that the message does not contain a payload section and is not of a predetermined message type;

the compressing means is further configured for leaving uncompressed those predefined parts of the protocol message, which contain information on the basis of which the protocol-aware intermediary node performs configurations for enabling data packets of a session associated with the protocol message to be transmitted from the transmitting side to the receiving side;

the compressing means is configured for selecting predefined parts not to be compressed on the basis of locally available protocol knowledge;

the compressing means is configured for selecting predefined parts not to be compressed on the basis of marks within the message;

the compressor constitutes a component of a user equipment (UE);

the compressor constitutes a component of a proxy call session control function (P-CSCF) device; and the compressor constitutes a component of a push-to-talk over cellular (PoC) server.

According to a fifth aspect of the invention, this object is for example achieved by a protocol-aware intermediary node for filtering protocol messages to be transmitted from a transmitting side via a protocol-aware intermediary node to a receiving side, wherein protocol messages comprise a header section and optionally a payload section, each of which being composed of a plurality of predefined parts, the intermediary node comprising: retrieving means for retrieving a compressing status of a protocol message to be filtered, said compressing status being indicative of the protocol message being fully compressed or not; transceiver means for relaying the protocol message, if it is retrieved that the protocol message is fully compressed; detecting means for detecting a type of the protocol message to be filtered, if it is retrieved that the protocol message is not fully compressed; and scanning means for scanning of the protocol message for identifying compressed and uncompressed predefined parts of the protocol message and for selectively processing, based on the detected message type and the scanning, certain predefined parts of the protocol message and leaving other predefined parts of the protocol message unprocessed.

According to further advantageous developments:

the detecting means is further configured for analyzing whether the protocol message contains a payload section or not;

the scanning means is further configured for extracting of information from those uncompressed predefined parts of the protocol message, which contain information on the basis of which the protocol-aware intermediary node performs configurations for enabling data packets of a session associated with the protocol message to be transmitted from the transmitting side to the receiving side;

the intermediary node is a firewall;

the intermediary node is a SIP-aware firewall;

the intermediary node further comprises a configuring means for performing configurations for enabling the data packets to be transmitted between the transmitting side and the receiving side; and the configuring means is further configured for setting up at least one pinhole for a session between the transmitting side and the receiving side, to which the message belongs.

According to a sixth aspect of the invention, this object is for example achieved by a system for transmitting protocol messages to be transmitted from a transmitting side via a protocol-aware intermediary node to a receiving side, wherein protocol messages comprise a header section and optionally a payload section, each of which being composed of a plurality of predefined parts, the system comprising: at least one compressor according to the fourth aspect; and at least one protocol-aware intermediary node according to the fifth aspect.

It is an advantage of the present invention that it allows the coexistence of protocol message compression and protocol-aware intermediary nodes, and thus providing the benefits of both.

It is another advantage of the present invention that it allows the existing protocol-aware intermediary nodes to operate with little or even no changes, which is not only a critical economical factor.

It is a further advantage of the present invention that no changes to the system architecture are needed, such as e.g. an introduction of additional protocols and/or entities.

Accordingly, it is an advantage of the embodiments of the present invention that they can be quickly deployed in near-term and with low implementation costs and/or efforts.

It is a yet further advantage of the present invention that no changes to the specification of the used compression technique are needed, and thus interoperability problems are prevented.

It is a further advantage of the embodiments of the present invention that they are applicable to a wide range of existing compression algorithms.

When applying the present invention, protocol messages carrying payload, for example SIP messages carrying SDP data, may have a slightly lower compression ratio than otherwise fully compressed signaling messages. However, the impact is negligible because of the following reasons. Firstly, the affected parts are usually only a small portion of the entire protocol message, and secondly, those parts may not be compressed well anyway due to a lack of redundancy therein. Note also that most protocol messages associated with a certain session do not carry payload anyway, and thus are not adversely affected.

An implementation according to the present embodiments only slightly introduces additional complexity on the transmitting side by leaving certain parts of certain protocol messages uncompressed. Advantageously, the additional complexity is negligible compared to the complexity that compression algorithms already have.

BRIEF DESCRIPTION OF THE DRAWINGS

In the following, the present invention will be described in greater detail with reference to the accompanying drawings, in which.

DETAILED DESCRIPTION OF EMBODIMENTS OF THE PRESENT INVENTION

The present invention is described herein with reference to a particular but non-limiting example. However, a person skilled in the art will appreciate that the invention is not limited thereby, and may be more broadly applied.

In particular, the aspects and embodiments of the present invention are exemplarily described in relation to the use of SIP protocol and SigComp compression, as described above. As such, the description of the embodiments given herein specifically refers to terminology which is directly related to SIP and SigComp. Such terminology is however only used in the context of the presented examples, and does not limit the invention in any way. In this spirit, it is to be noted that the ideas presented herein are also applicable when other compression schemes or protocols are used, and even with any protocol message that needs to be parsed by a protocol-aware firewall or any intermediary node in order to perform configurations to facilitate a transfer of user data through communication systems.

A protocol or SIP message in the sense of the following description is a message to be transmitted from a transmitting side via a protocol- or SIP-aware intermediary node to a receiving side, wherein the message comprises a header section and optionally a payload section, each of which is composed of a plurality of predefined parts or fields. In this context, it is to be noted that a transmitting/receiving side can be any communication entity such as a terminal equipment and a network element. Since it is not essential for the present invention from where the protocol message originates and where it is destined for, the general terms transmitting side and receiving side are used in the following.

Before describing implementation details of the present invention, there are given some remarks concerning the basic idea underlying the present invention.

Most compression algorithms (e.g. Lempel-Ziv) do not re-order an input stream during compression. The output of a compressor will be an interleaved sequence of compressed strings and uncompressed strings (which are left uncompressed e.g. because they are not compressible). Usually, the uncompressed strings are byte aligned. If not, the compression algorithm can be modified to do so. In addition, the compressor can always choose not to compress a particular string even if it can be compressed. Therefore, it is possible to obtain a compressed message that leaves out certain parts uncompressed (i.e. in "clear text"), so that a protocol-aware firewall can still parse the message and extract necessary information for pinhole configuration.

Figure 1:
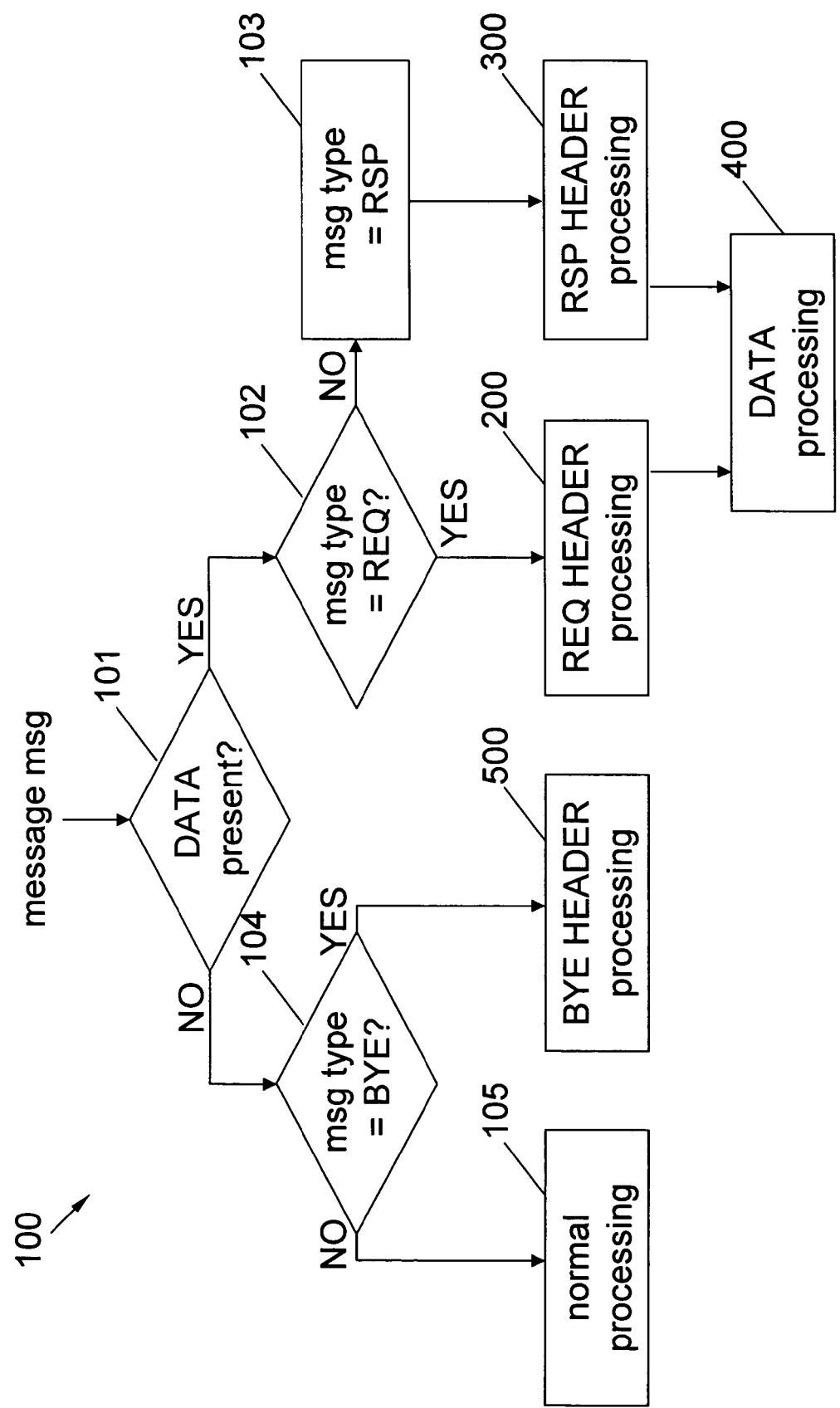
FIG. 1 depicts a general flow diagram of a compression method according to the present invention.

FIG. 1 depicts a general flow diagram of a compression method according to the present invention. The compression method as a whole is denoted by reference numeral 100. It can be carried out by a compressor according to the present invention.

As a first procedural function, a type of a SIP message to be compressed, hereinafter referred to as message msg, is detected by means of steps 101, 102, 103, and 104. In step 101, it is analyzed whether the message contains a payload section DATA or not. In the case of a SIP message, such payload data can e.g. be SDP protocol data (i.e. for session description). If so, it is detected in step 102 whether the message type is a request type REQ or not. If not, the message type is detected to be a response type RSP (step 103) since a SIP message is exclusively either a request from a client to a server or a response from a server to a client. If the SIP message does not contain a payload section (i.e. "no" in step 101), it is detected in step 104 whether the message is of a predetermined message type which in the present case is a BYE message type. Thereby, the detecting of the message type according to the present invention is completed.

In this regard, it is to be noted that a BYE message principally, according to the SIP specification, is a special kind of request message. For the purpose of the present application, it is however singled out because, although it does not carry a payload section, it terminates an associated session. In general, the term "message type" used herein is specific for the present application, and it is not to be mixed up with the like as used in the SIP specification (which only distinguishes between request and response message types).

Thereafter, the message is processed based on the detected message type. Fundamentally, based on the detected message type, certain predefined parts of the message are selectively compressed, and other predefined parts of the message are left uncompressed.

According to the present invention, a request message is subjected to a header section processing 200 and a payload section processing 400. A response message is subjected to a header section processing 300 and a payload section processing 400. A message of the BYE type is only subjected to a header section processing 500, and any other message without a payload section is processed/compressed as usual, i.e. is fully compressed.

The detailed processings of the individual message types according to embodiments of the present invention are illustrated in FIGS. 2 to 5.

Beforehand, general remarks on the processing order are to be considered for the remainder of the present application (concerning both compression and decompression). That is, except for the first line of a SIP message, the header fields in the header section may appear in different orders. Accordingly, the following steps of processing (as depicted in the respective figures) are not to be interpreted as the solely feasible or applicable order in which the processing in practice must take place. The same also applies to the order of fields in the payload section. Rather, the processing order shown herein represents an exemplary processing order being adapted to the order of appearance of the single fields in the below example message.

Figure 2:
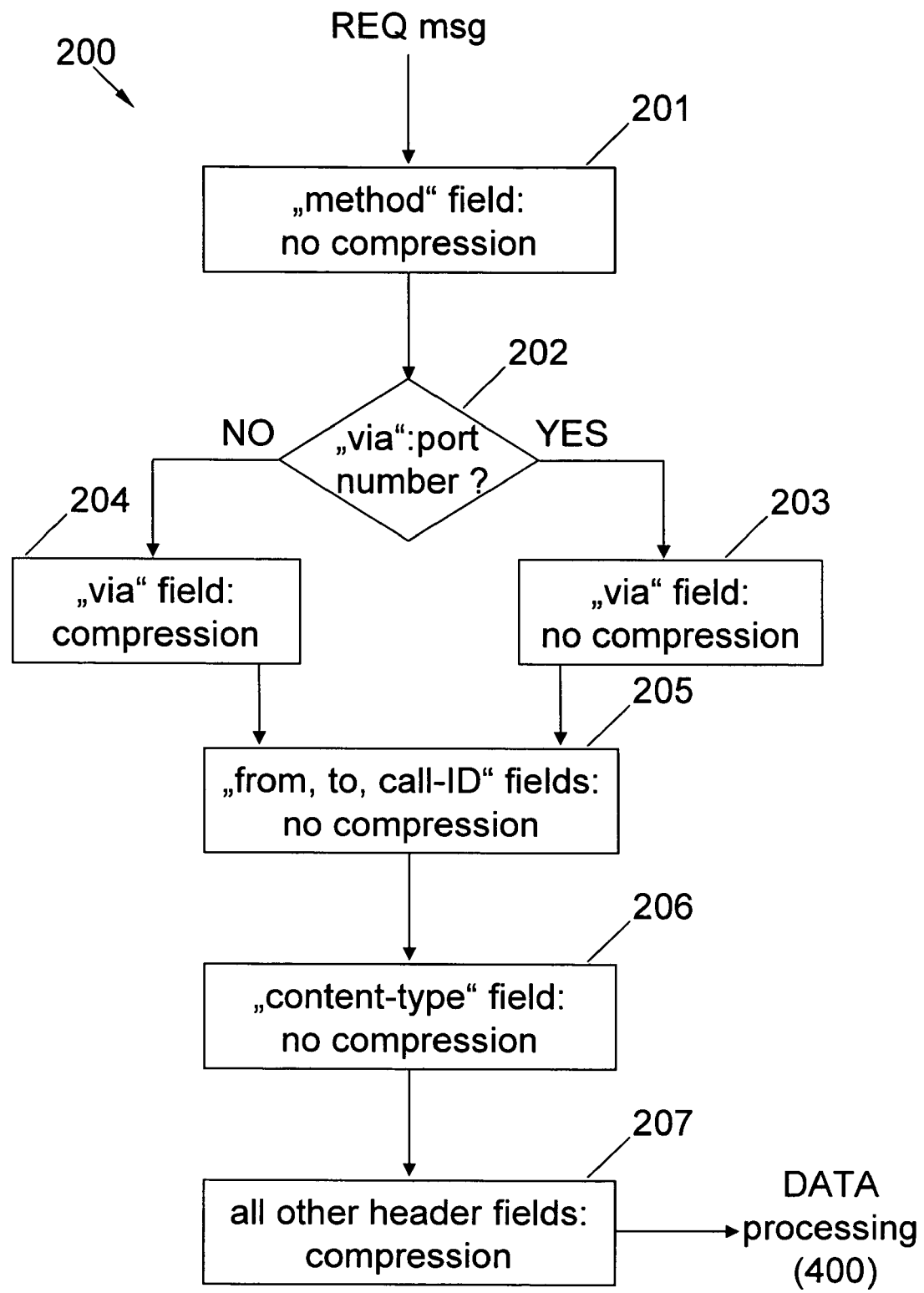
FIGS. 2 to 5 depict flow diagrams of specific compression methods according to embodiments of the present invention.

FIG. 2 depicts a flow diagram of a header section compressing method 200 for a request message (e.g. INVITE, ACK) according to an embodiment of the present invention.

For illustrative purposes, an exemplary request message according to the SIP protocol is given in the following. This exemplary SIP INVITE message will also serve as a basis for the following description. The contents and purpose of the single parts and fields of the message will only be explained as far as necessary for the understanding of the present invention.

- - - HEADER - - -
INVITE tel:+1-212-555-2222 SIP/2.0
Via: SIP/2.0/UDP [5555::aaa:bbb:ccc:ddd]:
1357; comp=sigcomp;branch=z9hG4bKnashds7
Max-Forwards: 70
Route: <sip:pcscf1.home1.net:7531;lr;comp=sigcomp>, <sip:scscf1.home1.net;lr>
P-Preferred-Identity: "John Doe" <tel:+1-212-555-1111>
P-Access-Network-Info: 3GPP-UTRAN-TDD; utran-cell-id-3gpp=234151D0FCE11
Privacy: none
From: <sip:user1 public1@home1.net>;tag=171828
To: <tel:+1-212-555-2222>
Call-ID: cb03a0s09a2sdfglkj490333
Cseq: 127 INVITE
Require: precondition, sec-agree
Proxy-Require: sec-agree
Supported: 100rel
Contact: <sip: [5555::aaa:bbb:ccc:ddd]:1357; comp=sigcomp>
Allow: INVITE, ACK, CANCEL, BYE, PRACK, UPDATE, REFER, MESSAGE
Security-Verify: ipsec-3gpp; q=0.1; alg=hmac-sha-1-96; spi-c=98765432; spi-s=87654321; port-c=8642; port-s=7531
Content-Type: application/sdp
Content-Length: ( . . . )
- - - SDP DATA - - -
v=0
o=−2987933615 2987933615 IN IP6 5555::aaa:bbb:ccc:ddd
s=−
c=IN IP6 5555::aaa:bbb:ccc:ddd
t=0 0
m=video 3400 RTP/AVP 98 99
b=AS:75
a=curr:qos local none
a=curr:qos remote none
a=des:qos mandatory local sendrecv
a=des:qos none remote sendrecv
a=rtpmap:98 H263
a=rtpmap:99 MP4V-ES
a=fmtp:98 profile-level-id=0
m=audio 3456 RTP/AVP 97 96
b=AS:25.4
a=curr:qos local none
a=curr:qos remote none
a=des:qos mandatory local sendrecv
a=des:qos none remote sendrecv
a=rtpmap:97 AMR
a=fmtp:97 mode-set=0,2,5,7; maxframes=2
a=rtpmap:96 telephone-event
- - - END OF MESSAGE - - -

For a request message, the "method" field in the "request-line" (i.e. the first line) is not compressed (step 201). This allows the SIP-aware firewall to determine the type of the message.

Then, it is checked in step 202 whether the "sent-by" parameter in a "Via" header field contains a port number. If yes, the "Via" header field up to—and including—the port number is not compressed (step 203). This may be needed by the firewall to capture the response to the request, which will be sent to the port number indicated in the "Via" header field. Otherwise (i.e. there is no port number), the "Via" header field can be compressed as normal (step 204).

Further (in step 205), the "From", "To", and "Call-ID" header fields are not compressed. This allows the firewall to identify the SIP dialog to which the message belongs, i.e. establishment information of a session between the transmitting side and the receiving side. A SIP dialog is used to create, modify and terminate a session as defined in the session description protocol (SDP). In addition, the line terminators CRLF immediately before and after these three header fields is not compressed. This is to ease the parsing of those fields by the firewall.

Next, the "Content-Type" header field and the line terminators CRLF immediately before and after the field are not compressed (step 206). In the example case, this field indicates to the firewall that the message carries SDP data, i.e. the type of payload.

With step 207, the request header processing is completed by compressing the remaining parts of the header as normal. Then, the header-processed message proceeds to a procedure 400 according to FIG. 4.

Figure 3:
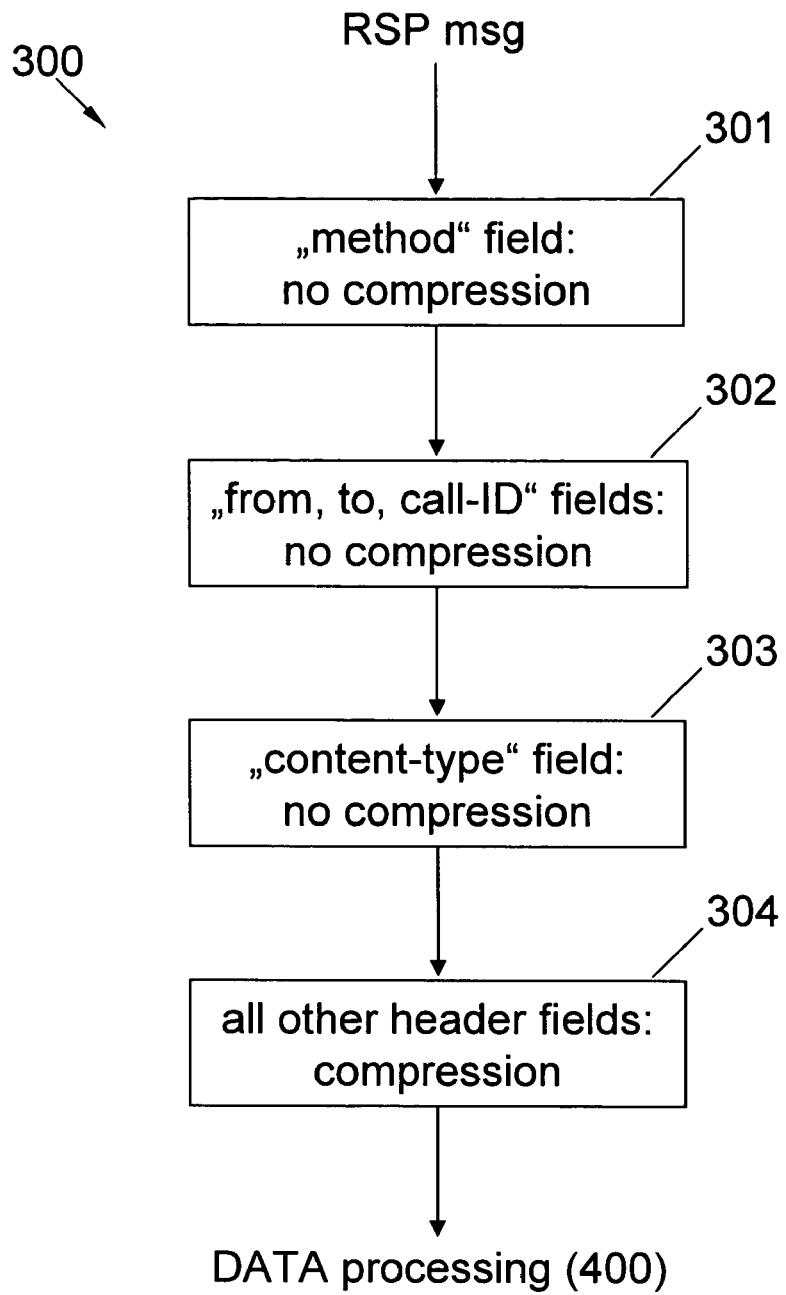
Figure 4:
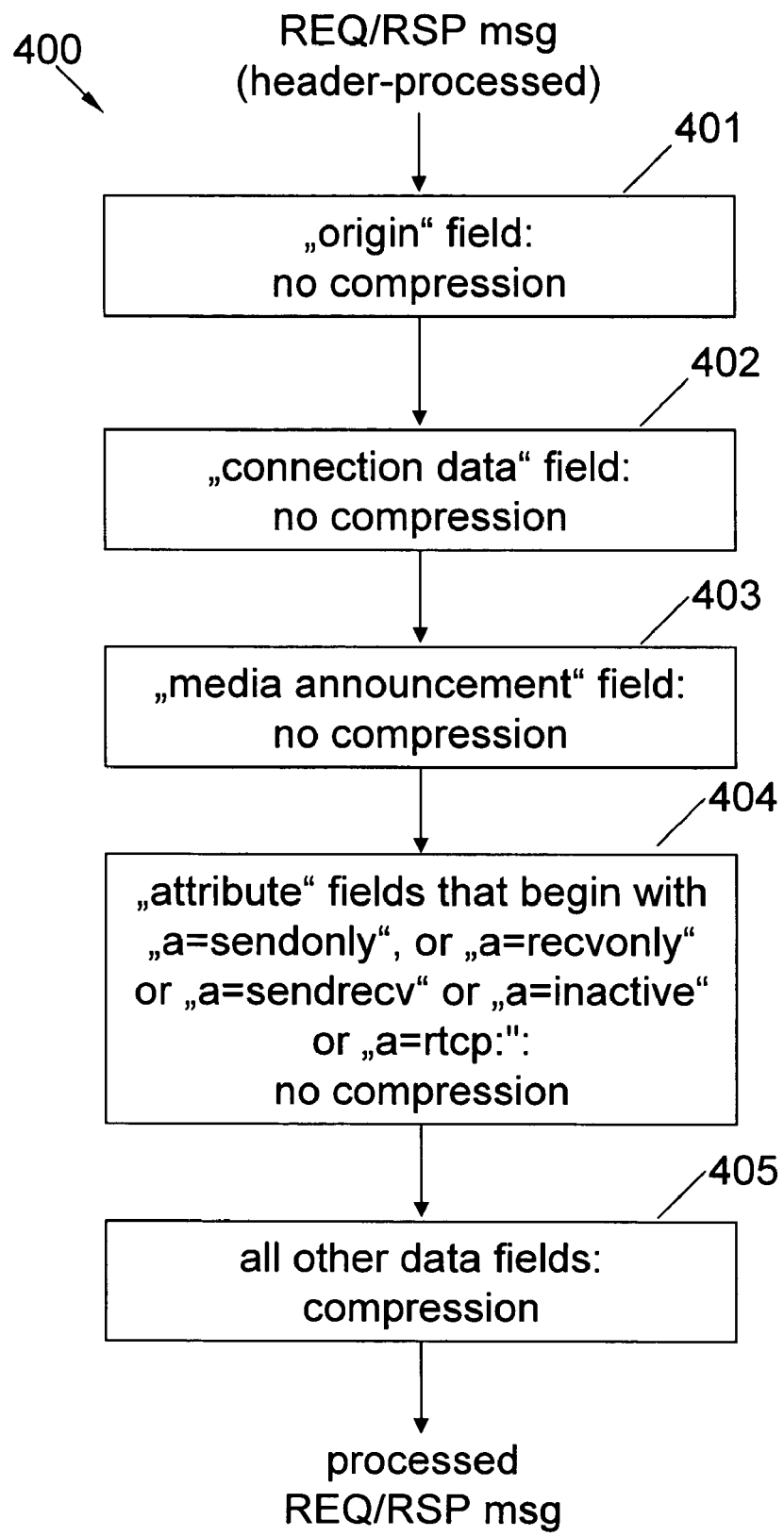

Before explaining FIG. 4, FIG. 3 depicts a flow diagram of a header section compressing method 300 for a response message (e.g. 200 OK, 183 Session Progress [see 3GPP TS 24.228]) according to an embodiment of the present invention.

For a response message, the "method" field of the "status-line" (i.e. the first line) is not compressed, as indicated by step 301. The reason is the same as explained above in connection with the request message. Then, steps 302, 303, and 304 basically correspond to steps 205, 206, and 207 of the header section compressing method 200 according to FIG. 2. Hence, they will not be described here in detail. Since a "via" header field does not appear in a response message, it also does not have to be processed (as compared to FIG. 2).

With step 304, the response header processing is completed, and the header-processed response message also proceeds to a procedure 400 according to FIG. 4.

FIG. 4 depicts a flow diagram of a payload section compressing method 400 for request and response messages according to an embodiment of the present invention. The incoming request and response messages have already been header-processed by methods 200 and 300, respectively.

In step 401, the "o=" line (i.e. the origin field) and line terminators CRLF immediately before and after it are left uncompressed. This field usually contains <username>, <session id>, <network type>, <address type>, and <address> sub-fields. The tuple of those sub-fields form a globally unique identifier for the session, which is needed by the firewall to identify the current session.

Next, the "c=" line (i.e. the connection data field) and line terminators CRLF immediately before and after it are left uncompressed (step 402). This field usually contains <network type>, <address type>, and <connection address> sub-fields. In the example message, <network type> is "IN" which means "Internet", <address type> could be either "IP4" (for Internet Protocol version 4) or "IP6" (for Internet Protocol version 6), and <connection address> indicates the network address to which the session data will be sent. This information relates to a logical association between the transmitting side and the receiving side, which information is needed for the firewall to create pinholes.

Then, in step 403, the "m=" line (i.e. the media announcement field) and line terminators CRLF immediately before and after it are left uncompressed. This field usually contains <media>, <port>, <transport>, and <fmt list> sub-fields. The <port> sub-field is the transport port (i.e. port number) to which the media stream will be sent. The <transport> sub-field indicates the transport protocol, e.g. RTP/AVP, UDP, TCP. These two sub-fields are of interest for the firewall to configure pinholes because they contain information relating to a transport of data between the communicating sides.

In step 404, parts being indicative of attributes relating to a transmission intention of the transmitting side are treated. If an "a=" line (i.e. the attribute field) begins with a string "a=sendonly" or "a=recvonly" or "a=sendrecv" or "a=inactive" or "a=rtcp:", the "a=" line and line terminators CRLF immediately before and after it are left uncompressed. The first four strings indicate whether the sender of the SIP message wishes to only send, only receive, or both send and receive, or neither send nor receive media packets from its peer (see RFC 3264 of IETF for detail). The "a=rtcp:" line specifies the RTCP (Real-Time Control Protocol) port number and optionally the address (see RFC 3605 of IETF for details). A SIP-ware firewall may use these information for pinhole configuration wherefore such information has to be left uncompressed. Note that "a=" lines not meeting the aforementioned conditions are fully compressed.

In step 405, all remaining parts and/or fields of the message are compressed as normal. Therewith, the processed request or response type message is compressed according to the present invention.

That is, those predefined parts of the protocol message are left uncompressed, which contain information on the basis of which the protocol-aware intermediary node performs configurations for enabling the protocol message and/or data packets of a session associated with the protocol message to be transmitted from the transmitting side to the receiving side. In the above example message, those parts are left uncompressed, which are designated underlined and in italics. These are then visible to a SIP-aware firewall.

In this regard, it is to be noted that the SIP protocol only sets up or closes a session between a transmitting side and a receiving side. However, data packets of the session are usually transmitted by other protocols (e.g. the Real-Time Transport Protocol, RTP) The SIP-aware firewall is to extract the information from SIP messages in order to find out information (e.g. IP address, port number) about the data packets transmitted by the non-SIP protocol. Thus, a performing of configurations according to the present invention may include allowing both signaling (SIP) messages and data packets of the session to pass the firewall.

It is to be noted that there are two options on how to identify the parts and/or fields of a message that should not be compressed. One option is to build limited protocol (SIP) knowledge into the SigComp compressor so that the compressor can identify those parts by itself. The other option is to let the protocol (SIP) layer mark those parts and instruct the compressor not to compress them. The former option allows a cleaner interface between SIP and SigComp, but requires additional logic in the compressor. The latter option needs a slightly more complicated interface, but keeps SIP knowledge within a SIP module and simplifies the SigComp logic. Which one to use is a mere implementation choice.

For a SIP message which does not carry a payload section with SDP protocol data, and which is not of a predetermined message type (for example, the BYE message type), a normal processing/compression is used (see step 105 of FIG. 1). That is, a BYE message should be treated according to the present invention, which is due to the fact that a BYE message is used to terminate a session, and a SIP-aware firewall thus needs it to close the pinhole(s) that have been opened for the session.

Figure 5:
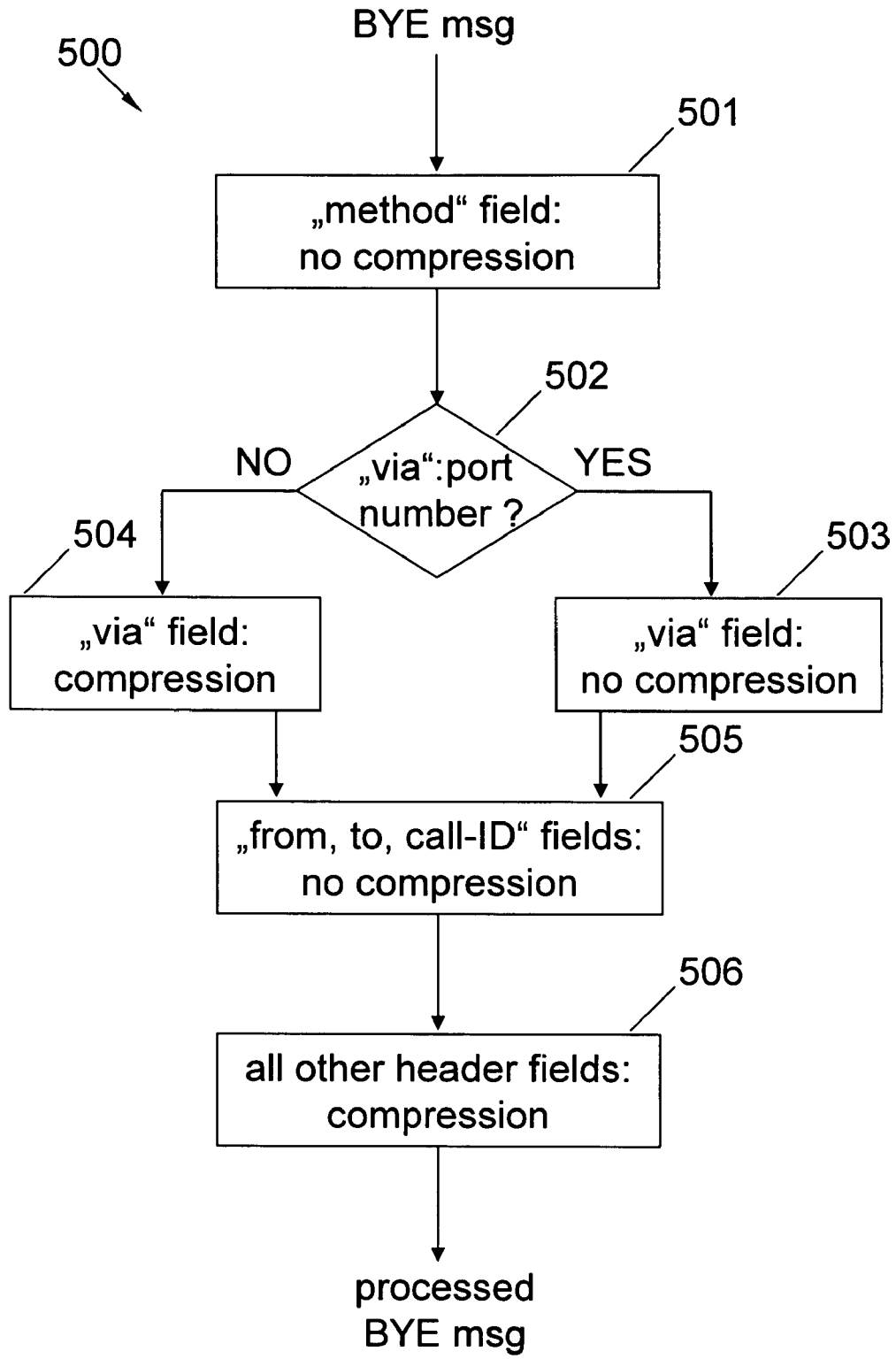

FIG. 5 depicts a flow diagram of a header section compressing method 500 for a message of the BYE type according to an embodiment of the present invention.

As mentioned above, a BYE message is a special kind of request message. Hence, the method 500 is comparable to the header section compressing method 200 for a request message according to FIG. 2, except that the BYE message does not contain a payload section as does the REQ message of FIG. 2. For details, reference is made to the above explanation of respective steps of FIG. 2. The difference is that a BYE message does not contain a "Content-Type" header field, and thus step 206 of FIG. 2 is obsolete here. Furthermore, after compressing of all remaining fields in step 506, the processing of a BYE message according to the present invention is completed since it does not-contain a header section DATA.

It is to be noted that a SigComp compressor for simplicity may even choose not to compress the entire BYE message. This will cause a slightly larger transmission delay. However, this is not a concern to the users since it is sent at the end of a session anyway.

Note that after a SigComp compressor processes a SIP message as described above, it will encapsulate the processed message according to RFC 3320 of IETF. Essentially, a SigComp header will be added in front of the processed SIP message and, in case TCP is used as the underlying transport protocol, a special delimiter (i.e. 0xFFFF) will be added at its end. Details thereof are beyond the scope of this document.

When a SIP-aware firewall receives a SIP message being compressed in accordance with any of the methods of FIGS. 2 to 5, it can parse the message and extract needed information as if the message was not compressed (see note below). This is based on the idea that the compressing method leaves critical information uncompressed and therefore visible to the firewall. The compressed parts will just look like "garbage" to the firewall, i.e. they are not usable, and can be overleaped.

Note that the SIP-aware firewall needs to first skip/ignore the Sigcomp header that precedes the processed SIP message. This requires only a simple parsing of the SigComp header (see RFC 3320 of IETF). In addition, if TCP is used as the transport protocol, the firewall needs to determine the end of the message by detecting the special delimiter (i.e. 0xFFFF). Alternatively, an implementation may choose to add a separate function unit before the SIP-aware firewall to perform these operations. This minimizes changes to the firewall itself. Details thereof are beyond the scope of this document.

Figure 6:
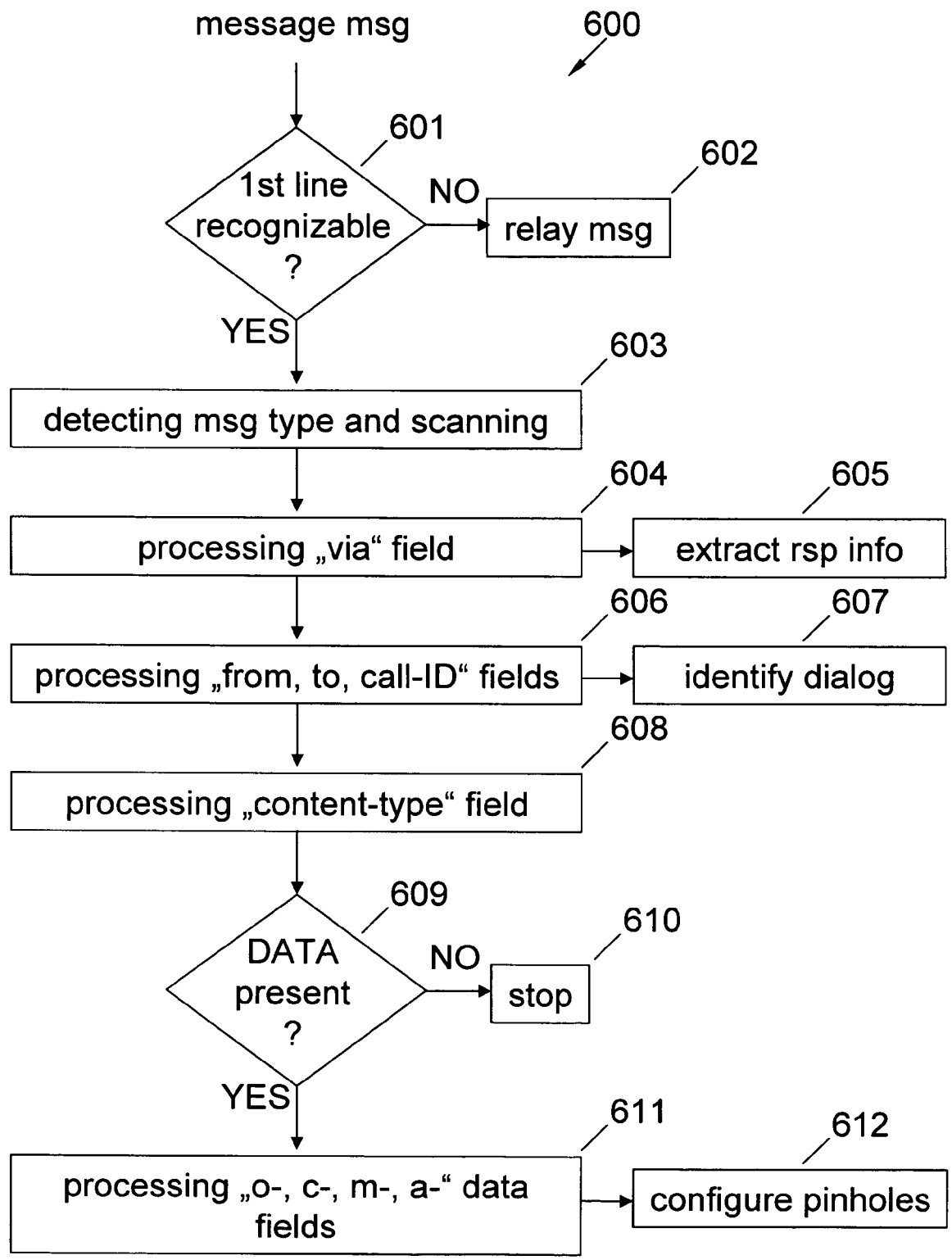
FIG. 6 depicts a flow diagram of a filtering method according to an embodiment of the present invention.

FIG. 6 depicts a flow diagram of a filtering method 600 according to an embodiment of the present invention. It can be carried out by a protocol-aware intermediary node or firewall according to the present invention. Depending on how the firewall is implemented, there need to be little or even no changes to its procedures.

As usual, the first line of the incoming message msg is scanned. If it is unrecognizable (i.e. "no" in step 601), the message is definitely fully compressed, the procedure is stopped, and in step 602 the message is, for example, relayed to its destination (possibly with a further processing). Alternatively, the message can also be processed differently in step 602, for example dropped, stored, or relayed on demand. Otherwise (i.e. "yes" in step 601), the message is not fully compressed and thus can be processed further. Stated in other words, step 601 represents a retrieving of a compressing status of the message to be filtered, wherein said compressing status indicates whether the message is fully compressed (as normal) or not (as according to the compressing of the present invention).

Note that it is possible—though unlikely in practice—that in a normally compressed message, the first line is still recognizable (i.e. uncompressed). In that case, the message may be mistaken as having been processed according to the method of the present invention. However, it only means that the scanning described below will not lead to any action by the protocol-aware intermediary node. Therefore the method still works correctly even in such a rather unlikely case.

After retrieving that the message is (very likely) not fully compressed and thus usable, the method proceeds to step 603 where the message type is detected. Also in step 603, a scanning of the protocol message for identifying compressed and uncompressed predefined parts of the protocol message is performed. Since predefined parts of both states, i.e. compressed and uncompressed, are usually mingled within the protocol message, the intermediary nodes knows which one of the predefined parts is in which state after scanning the entire message.

In the sequel, a selective processing is performed based on the detected message type and the scanning results, wherein certain predefined parts of the message are processed, and other predefined parts are left unprocessed. In FIG. 6, only the scanning of predefined parts is depicted, and the leaving unscanned of predefined parts is not explicitly shown. The scanning also comprises an extracting of information from those uncompressed predefined parts of the protocol message, which contain information on the basis of which the firewall performs configurations for enabling the data packets to be transmitted.

In step 604 of FIG. 6, the "Via" header field is processed, and if it is in clear text, transport information for the SIP response are extracted in step 605 so that the firewall can capture the response.

In the next step 606 the "From", "To", and "Call-ID" header fields are processed. This allows the firewall to identify the SIP dialog (in step 607) to which the message belongs. In particular, this is needed in order to match a BYE message (which terminates a session) to the corresponding INVITE message (which created the session beforehand).

The filtering method also comprises an analyzing whether the message to be filtered contains a payload section DATA. This is accomplished by steps 608 and 609. In step 608, "Content-Type" header field is processed. If it is not found (meaning compressed) or it does not contain information indicative of the type of payload (e.g. "application/sdp"), the message does not contain a payload section, i.e. does not carry SDP data. In this case, the method is stopped in step 610.

Otherwise, the method proceeds to a processing of certain predefined parts of the payload section. Namely, in step 611, the "o=", AN, "m", and "a=" fields in the SDP data section are processed and then used, if appropriate, together with previously extracted information, to configure pinholes in step 612, i.e. to perform configurations for enabling the message to be transmitted between the transmitting side and the receiving side. For the exact information contained in these fields, reference is made to the above description of FIG. 2.

It is to be noted that the order of processing presented above, i.e. first scanning the entire message and then processing interesting parts thereof, is only one implementation choice in accordance with the flow diagram of FIG. 6.

In an alternative and advantageous implementation choice, scanning an incoming message and processing of predefined parts thereof is performed in the same pass. In detail, an intermediary node also scans the message from the beginning to the end and searches for interesting parts (in the present case, parts being uncompressed). This can, for example, be done by comparing a current string in the message with a predefined list of strings being indicative of interesting parts. As an example, if a current string starts with the string "Via", then the intermediary node knows that a "Via" header field is concerned. When an interesting (i.e. uncompressed) predefined part is detected, the intermediary node directly processes the respective part accordingly (see FIG. 6) before continuing the scanning of the remaining message. So, the filtering procedure can be done with only one pass (or scan) over the entire message.

Further, it is to be noted that a detection and capturing of SIP messages will remain the same as the case where SIP messages are uncompressed. The details are beyond the scope of this application. Usually, the procedure is based on the default SIP port number (e.g. 5060 for UDP, TCP and SCTP, and 5061 for TLS) and the port number indicated in the "Via" header field of a request message.

Although having been described separately in the above, the compressing method and the filtering method according to embodiments of the present invention can also be regarded as a common method of transmitting protocol messages.

The compressing and filtering according to embodiments of the present invention does not have any impact on decompressing operations performed at the receiving side. Usually, the compressed message is a mix of compressed parts and uncompressed parts. A decompressor decompresses received messages as usual. The compressing scheme is such that it allows the decompressor to detect (as part of a decoding process) which case it is dealing with when decompressing a message. For the uncompressed parts, the decompressor still needs to copy them to the output so that after decompression the original message is reconstructed. So, the decompressor actually needs to process uncompressed parts too. Therewith, it is assured that a conventional decompressor being adapted to distinguish between compressed and uncompressed parts of a message is compatible with the procedures described above.

The following relates to the apparatuses and the system according to the present invention. Therein, FIG. 7 depicts a generic block diagram of a system according to an embodiment of the present invention.

Figure 7:
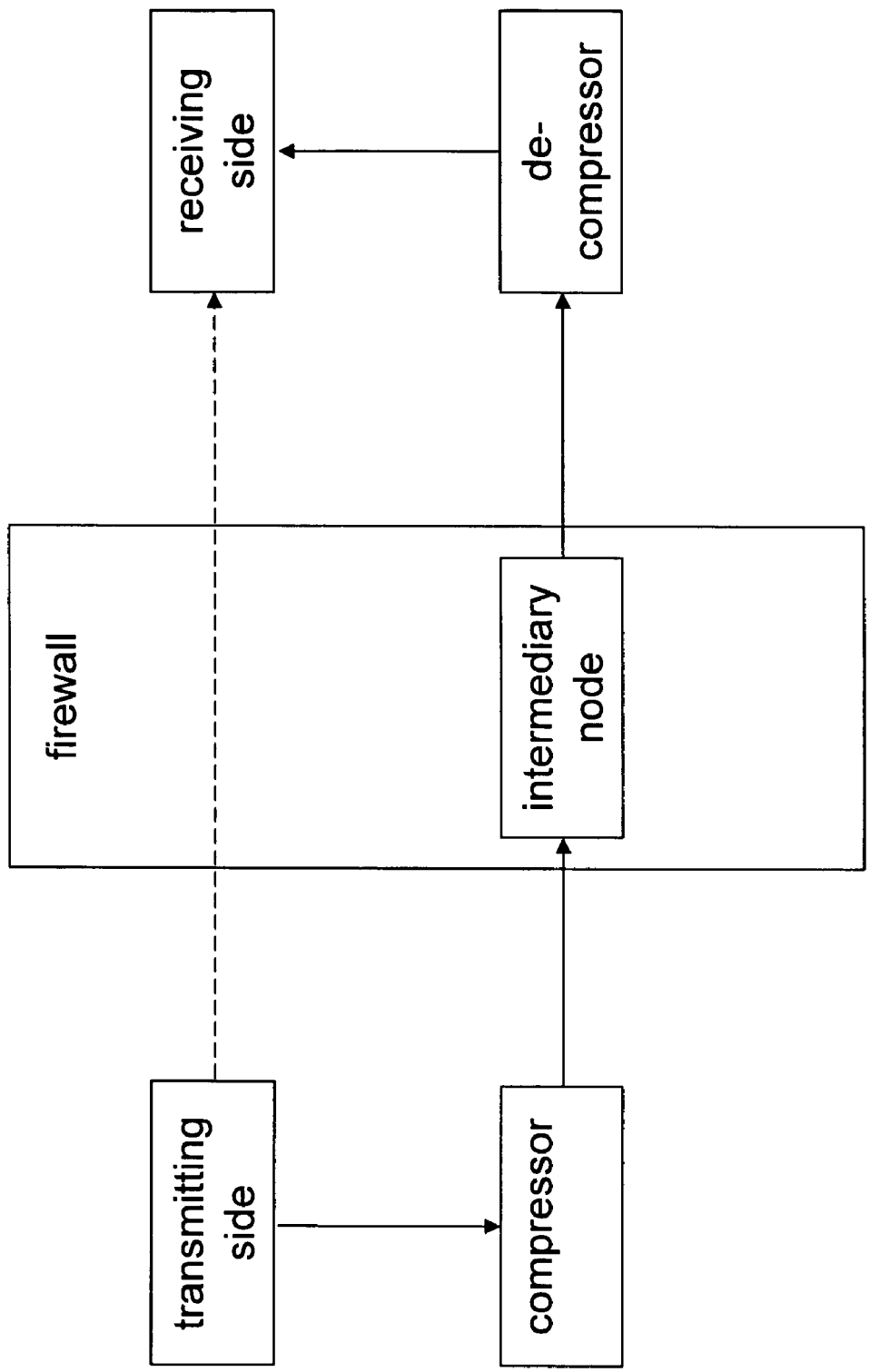
FIG. 7 depicts a generic block diagram of a system according to an embodiment of the present invention.

In FIG. 7, the basic situation is depicted with a transmitting side having a logical connection (i.e. a session) with a receiving side, which is illustrated by a broken arrow. A protocol-aware intermediary node being denoted by firewall is located on the communication path in between the transmitting side and the receiving side. Thus, a protocol (SIP) message to be transmitted between these units has to pass the firewall.

The physical route taken by a message from the transmitting side to the receiving side is illustrated by a sequence of solid arrows. It first leads from the transmitting side to a compressor according to the present invention. The compressor is adapted to carry out the compressing method described above. It can, for example, constitute a component of a user equipment (UE), a component of a proxy call session control function (P-CSCF), or a component of a push-to-talk over cellular (PoC) server. The compressed message is transferred from the compressor to a protocol-aware intermediary node according to the present invention. This node can represent a firewall why it is illustrated within the firewall block. The intermediary node is adapted to carry out the filtering method described above. The filtered message is then transmitted to a decompressor, and from there to the receiving side.

Figure 8:
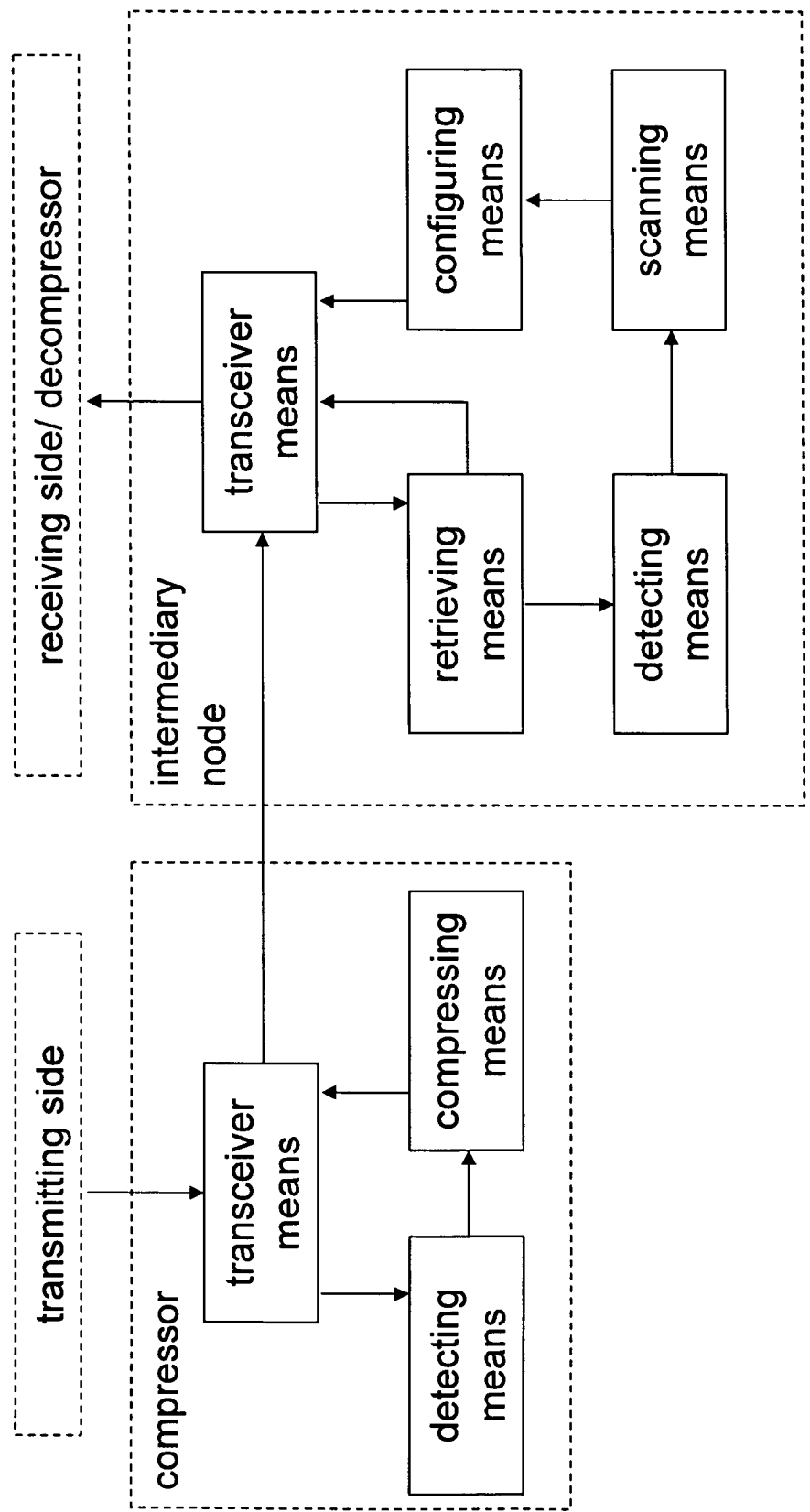
FIG. 8 depicts a block diagram of a system according to an embodiment of the present invention, which illustrates the internal structure of involved apparatuses.

FIG. 8 depicts a block diagram of a system according to an embodiment of the present invention. The figure illustrates the internal structure of apparatuses involved in a protocol message transmission, in particular of a compressor and an intermediary node according to an embodiment of the present invention.

The compressor comprises a transceiver means for a physical communication (i.e. a physical transfer of messages) from the transmitting side and to the intermediary node. According to the present embodiment, the compressor comprises a detecting means for detecting a type of a message to be compressed, which is received from the receiving side via the transceiver means. The detecting means is further configured for analyzing whether the message contains a payload section or not. Further, the compressor comprises compressing means for selectively compressing, based on the detected message type, certain predefined parts of the message and leaving other predefined parts uncompressed. The compressing means can, if the detecting means yields that the message does not contain a payload section, also compress all parts of the message. The compressing means can operate either on the basis of locally available protocol (SIP) message, or on the basis of marks within the messages, which indicate which parts to be compressed or to be left uncompressed.

The message compressed by the compressing means is forwarded to the transceiver means, and from there to the intermediary node or firewall.

The intermediary node comprises a transceiver means for a physical communication (i.e. a physical transfer of messages) from the compressor and to the receiving side and/or a decompressor. According to the present embodiment, the intermediary node comprises a retrieving means for retrieving a compressing status of the message received from the transceiver means. In dependence on the retrieved compressing status, the message is forwarded either to a transceiver means for being relayed to the receiving side without any further operations, or to a detecting means for detecting a type of the message, if is retrieved that the message is not fully compressed. The detecting means is further configured for analyzing whether the protocol message contains a payload section or not. From the detecting means, the message to be filtered is forwarded to a scanning means. The scanning means is configured for scanning of the protocol message for identifying compressed and uncompressed predefined parts of the protocol message and for selectively processing, based on the detected message type and the scanning, certain predefined parts of the protocol message and leaving other predefined parts of the protocol message unprocessed. The scanning means is further configured for extracting information from those uncompressed parts of the message, which contain information on the basis of which the intermediary node performs configurations for enabling data packets of a session associated with the protocol message to be transmitted to the receiving side. For this purpose, the message (or the required information extracted at the scanning means) is then forwarded to a configuring means which is adapted for performing configurations for enabling the data packets to be transmitted to the receiving side, which is then physically accomplished by the transceiver means of the intermediary node.

It is to be noted that the mentioned functional steps of the described method and the functional elements of the described arrangements as well as their constituents can be implemented by any known means, either in hardware and/or software, respectively, if they are only adapted to perform the respective effects and/or functions described above. For example, the detecting means of the compressor can be implemented by any analogue or digital data processing unit, e.g. a microprocessor, a digital signal processor (DSP), or an application-specific integrated circuit (ASIC), which is adapted to detect a type of a protocol message. In case of a hardware implementation, the specific technology used is irrelevant to the present invention, such as e.g. MOS or bipolar transistors. In case of a software implementation, the implementation is independent from the specific programming language or environment used, such as e.g. C++, Assembler.

The mentioned parts and functions can also be realized in separate or individual functional blocks, or one or more of the mentioned parts and functions can be realized in common or jointly (independent from the way they are illustrated in any of the figures).

In summary, the present invention describes a solution that allows a protocol message compression to coexist with protocol-aware intermediary nodes, for example SIP compression to coexist with SIP-aware firewalls. In particular, a Sig- Comp compressor can leave certain parts of certain protocol message uncompressed so that a protocol-aware firewall can still extract information it needs to set up and/or configure respective pinholes. The remaining parts of the protocol message and the entirety of other unaffected protocol messages can still be compressed to reduce transmission delay. Therefore, this solution allows the benefit of both protocol message compression and protocol-aware firewalls.

Exemplarily, the embodiments of the present invention are related to SIP—(Session Initiation Protocol) aware firewalls and SIP compression. In this connection, the present invention can be understood as a particular way of implementing SigComp compression such that it is compatible with SIP-aware firewalls. Accordingly, the embodiments of the present invention can be used in any devices where, for example, SigComp compression is implemented.

According to the present invention, there are provided methods, apparatuses, and a system for compressing, filtering, and transmitting of protocol messages to be transmitted from a transmitting side via a protocol-aware intermediary node to a receiving side, the compressing method comprising the steps of: detecting a type of a protocol message to be compressed; and selectively compressing, based on the detected message type, certain predefined parts of the protocol message and leaving other predefined parts of the protocol message uncompressed, and the filtering method, if it is retrieved that the protocol message is not fully compressed, comprising the steps of: detecting a type of the protocol message to be filtered; scanning of the protocol message for identifying compressed and uncompressed predefined parts of the protocol message; and selectively processing, based on the detected message type and the scanning, certain predefined parts of the protocol message and leaving other predefined parts of the protocol message unprocessed.

Even though the invention is described above with reference to the examples according to the accompanying drawings, it is clear that the invention is not restricted thereto. Rather, it is apparent to those skilled in the art that the present invention, and in particular its implementation, can be modified or varied in many ways without deviating from the scope of the inventive idea as disclosed in the appended claims.

The invention claimed is:

1. A method, comprising:
   detecting a type of a protocol message to be compressed, wherein the protocol message comprises a message of a certain protocol having a header section composed of a plurality of predefined parts; and
   selectively compressing, based on the detected protocol message type, certain ones of said predefined parts of the protocol message and leaving other ones of said predefined parts of the protocol message uncompressed, wherein the selectively compressing leaves uncompressed the predefined parts of the protocol message, wherein the predefined parts comprise information based on which a protocol-aware intermediary node performs configurations to enable data packets of a session associated with the protocol message to be transmitted from a transmitting side to a receiving side.

2. The method according to claim 1, wherein the detecting comprises analyzing whether the protocol message comprises a payload section being composed of a plurality of predefined parts.

3. The method according to claim 2, wherein the selectively compressing comprises compressing all parts of the protocol message when a detection is made that the protocol message does not contain a payload section and is not of a predetermined message type.

4. The method according to claim 2, wherein the payload section comprises a payload in accordance with a session description protocol.

5. The method according to claim 1, wherein the selectively compressing leaves uncompressed at least one predefined part being indicative of the type of the protocol message.

6. The method according to claim 1, wherein the selectively compressing leaves uncompressed at least one predefined part indicative of information to capture a response to the protocol message.

7. The compressing method according to claim 1, wherein the selectively compressing leaves uncompressed at least one predefined part indicative of establishment information of a session between a transmitting side and a receiving side to which the protocol message belongs.

8. The method according to claim 1, wherein the selectively compressing leaves uncompressed at least one predefined part indicative of a type of a payload section of the protocol message.

9. The method according to claim 1, wherein the selectively compressing leaves uncompressed at least one predefined part indicative of an identification of a session between a transmitting side and a receiving side to which the protocol message belongs.

10. The method according to claim 1, wherein the selectively compressing leaves uncompressed at least one predefined part indicative of information relating to a logical association between a transmitting side and a receiving side.

11. The method according to claim 1, wherein the selectively compressing leaves uncompressed at least one predefined part indicative of information relating to a transport of data between a transmitting side and a receiving side.

12. The method according to claim 1, wherein the selectively compressing leaves uncompressed at least one predefined part indicative of attributes relating to a transmission intention of a transmitting side.

13. The method according to claim 1, wherein the selectively compressing leaves uncompressed separation markings before and after specific predefined parts.

14. The method according to claim 1, wherein said detecting comprises detecting the type of the protocol message to be compressed, wherein the protocol message comprises a message of an application layer protocol according to an International Standards Organization Open System Interconnect reference model.

15. The method according to claim 1, wherein said detecting comprises detecting the type of the protocol message to be compressed, wherein the protocol message comprises a message of a session initiation protocol.

16. The method according to claim 1, wherein the selectively compressing operates in accordance with a signaling compression technique.

17. A method, comprising:
   retrieving a compressing status of a protocol message to be filtered, wherein the protocol message comprises a message of a certain protocol having a header section composed of a plurality of predefined parts, wherein said compressing status is indicative of whether the protocol message is fully compressed; and
   relaying the protocol message when the retrieved compressing status indicates that the protocol message is fully compressed, wherein when the retrieved compressing status indicates that the protocol message is not fully compressed, the method further comprises
   detecting a type of the protocol message to be filtered;

scanning the protocol message to identify compressed and uncompressed predefined parts of the protocol message; and selectively processing, based on the detected message type and the scanning, certain ones of said predefined parts of the protocol message and leaving other ones of said predefined parts of the protocol message unprocessed.

18. The method according to claim 17, wherein the detecting comprises analyzing whether the protocol message contains a payload section comprising a plurality of predefined parts.

19. The method according to claim 18, wherein the payload section comprises a payload in accordance with a session description protocol.

20. The method according to claim 17, wherein the selectively processing comprises extracting information from the uncompressed predefined parts of the protocol message, wherein the predefined parts comprises information based on which a protocol-aware intermediary node performs configurations to enable data packets of a session associated with the protocol message to be transmitted from a transmitting side to a receiving side.

21. The method according to claim 17, wherein the selectively processing comprises extracting information being indicative of capturing a response to the protocol message.

22. The method according to claim 17, wherein the selectively processing comprises extracting information indicative of an establishment of a session between a transmitting side and a receiving side to which the protocol message belongs.

23. The method according to claim 17, wherein the selectively processing comprises an extracting of information indicative of a type of a payload section of the protocol message.

24. The method according to claim 17, wherein the selectively processing comprises extracting information indicative of an identification of a session between a transmitting side and a receiving side to which the protocol message belongs.

25. The method according to claim 17, wherein the selectively processing comprises extracting information indicative of a logical association between a transmitting side and a receiving side.

26. The method according to claim 17, wherein the selectively processing comprises extracting information indicative of a transport of data between a transmitting side and a receiving side.

27. The method according to claim 17, wherein the selectively processing comprises extracting information indicative of attributes relating to a transmission intention of a transmitting side.

28. The method according to claim 17, further comprising:
performing configurations to enable data packets to be transmitted between a transmitting side and a receiving side.

29. The method according to claim 28, wherein the performing of configurations is carried out at the protocol-aware intermediary node and is based on information extracted from the protocol message to be filtered.

30. The method according to claim 28, wherein the performing of configurations comprises setting up at least one pinhole for a session between the transmitting side and the receiving side to which the protocol message belongs.

31. The method according to claim 17, wherein the protocol message comprises a message of an application layer protocol according to an International Standards Organization Open System Interconnect reference model.

32. The method according to claim 17, wherein the protocol message comprises a message of a session initiation protocol.

33. The method according to claim 17, wherein said scanning comprises scanning the protocol message to identify compressed predefined parts, and wherein the compressed predefined parts of the protocol message are compressed in accordance with a signaling compression technique.

34. A method, comprising:
compressing a protocol message to be transmitted by detecting a type of a protocol message to be compressed, wherein the protocol message comprises a message of a certain protocol having a header section composed of a plurality of predefined parts;

selectively compressing, based on the detected protocol message type, certain ones of said predefined parts of the protocol message and leaving other ones of said predefined parts of the protocol message uncompressed;

filtering the protocol message by retrieving a compressing status of a protocol message to be filtered, wherein said compressing status is indicative of whether the protocol message is fully compressed; and relaying the protocol message when the retrieved compressing status indicates that the protocol message is fully compressed, wherein when the compressing status retrieved indicates that the protocol message is not fully compressed, the method further comprises detecting a type of the protocol message to be filtered;

scanning the protocol message to identify compressed and uncompressed predefined parts of the protocol message; and selectively processing, based on the detected message type and the scanning, certain ones of said predefined parts of the protocol message and leaving other ones of said predefined parts of the protocol message unprocessed.

35. An apparatus, comprising:
a processor configured to
detect a protocol message to be compressed, wherein the protocol message comprises a message of a certain protocol having a header section composed of a plurality of predefined parts, and selectively compress, based on the detected protocol message type, certain ones of said predefined parts of the protocol message and leaving other ones of said predefined parts of the protocol message uncompressed, wherein the processor is further configured to leave uncompressed the predefined parts of the protocol message that contain information based on which a protocol-aware intermediary node is configured to enable data packets of a session associated with the protocol message to be transmitted from a transmitting side to a receiving side.

36. The apparatus according to claim 35, wherein the processor is further configured to analyze whether the protocol message contains a payload section comprising a plurality of predefined parts.

37. The apparatus according to claim 36, wherein the processor is further configured to compress all parts of the protocol message when the detector indicates that the protocol message does not contain a payload section and is not of a predetermined message type.

38. The apparatus according to claim 35, wherein the processor is configured to select predefined parts not to be compressed based on locally available protocol information.

39. The apparatus according to claim 35, wherein the processor is configured to select predefined parts not to be compressed based on marks within the protocol message.

40. The apparatus according to claim 35, wherein the apparatus comprises a component of a user terminal.

41. The apparatus according to claim 35, wherein the apparatus comprises a component of a proxy call session control function device.

42. The apparatus according to claim 35, wherein the apparatus comprises a component of a push-to-talk over cellular server.

43. An apparatus, comprising:
a processor configured to
retrieve a compressing status of a protocol message to be filtered, wherein the protocol message comprises a message of a certain protocol having a header section being composed of a plurality of predefined parts, wherein said compressing status is indicative of whether the protocol message is fully compressed;
relay the protocol message when the retrieved compressing status indicates that the protocol message is fully compressed;
detect a type of the protocol message to be filtered when the retrieved compressing status indicates that the protocol message is not fully compressed; and
scan the protocol message to identify compressed and uncompressed predefined parts of the protocol message and to selectively process, based on the detected protocol message type and the scanning, certain ones of said predefined parts of the protocol message and leaving other ones of said predefined parts of the protocol message unprocessed.

44. The apparatus according to claim 43, wherein the processor is further configured to analyze whether the protocol message contains a payload section comprising a plurality of predefined parts.

45. The apparatus according to claim 43, wherein the processor is further configured to extract information from the uncompressed predefined parts of the protocol message that contain information based on which a protocol-aware intermediary node performs configurations to enable data packets of a session associated with the protocol message to be transmitted from a transmitting side to a receiving side.

46. The apparatus according to claim 43, wherein the apparatus comprises a firewall.

47. The apparatus according to claim 46, wherein the apparatus comprises a session initiation protocol-aware firewall.

48. The apparatus according to claim 43, wherein the processor is further configured to perform configurations to enable data packets to be transmitted from a transmitting side to a receiving side.

49. The apparatus according to claim 48, wherein the processor is further configured to set up at least one pinhole for a session from the transmitting side to the receiving side to which the protocol message belongs.

50. A system, comprising:
at least one first processor configured to detect a type of a protocol message to be compressed, wherein the protocol message comprises a message of a certain protocol having a header section composed of a plurality of predefined parts, and to selectively compress, based on the detected protocol message type, certain predefined parts of the protocol message and leave other predefined parts of the protocol message uncompressed; and
at least one protocol-aware intermediary node, wherein said at least one protocol-aware intermediary node comprises a second processor configured to
retrieve a compressing status of a protocol message to be filtered, wherein said compressing status is indicative of whether the protocol message is fully compressed;
relay the protocol message when the compressing status retrieved indicates that the protocol message is fully compressed;
detect a type of the protocol message to be filtered when the compressing status retrieved indicates that the protocol message is not fully compressed; and
scan the protocol message to identify compressed and uncompressed predefined parts of the protocol message and to selectively process, based on the detected protocol message type and the scanning, certain ones of said predefined parts of the protocol message and leave other ones of said predefined parts of the protocol message unprocessed.

51. A computer program embodied on a computer-readable medium, the program configured to control a processor to perform a process, the process comprising:
detecting a type of a protocol message to be compressed, wherein the protocol message comprises a message of a certain protocol having a header section composed of a plurality of predefined parts; and
selectively compressing, based on the detected protocol message type, certain ones of said predefined parts of the protocol message and leaving other ones of said predefined parts of the protocol message uncompressed, wherein the selectively compressing leaves uncompressed the predefined parts of the protocol message, wherein the predefined parts comprise information based on which a protocol-aware intermediary node performs configurations to enable data packets of a session associated with the protocol message to be transmitted from a transmitting side to a receiving side.

52. A computer program embodied on a computer-readable medium, the program configured to control a processor to perform a process, the process comprising:
retrieving a compressing status of a protocol message to be filtered, wherein the protocol message comprises a message of a certain protocol having a header section being composed of a plurality of predefined parts, wherein said compressing status is indicative of whether the protocol message is fully compressed; and
relaying the protocol message when the retrieved compressing status indicates that the protocol message is fully compressed, wherein
when the retrieved compressing status indicates that the protocol message is not fully compressed, the process further comprises
detecting a type of the protocol message to be filtered;
scanning the protocol message to identify compressed and uncompressed predefined parts of the protocol message; and
electively processing, based on the detected message type and the scanning, certain ones of said predefined parts of the protocol message and leaving other ones of said predefined parts of the protocol message unprocessed.

53. An apparatus comprising:
detecting means for detecting a protocol message to be compressed, wherein the protocol message comprises a message of a certain protocol having a header section composed of a plurality of predefined parts; and
compressing means for selectively compressing, based on the detected protocol message type, certain ones of said predefined parts of the protocol message and leaving other ones of said predefined parts of the protocol message uncompressed wherein the compressing means is configured to leave uncompressed the predefined parts of the protocol message, wherein the predefined parts comprise information based on which a protocol-aware intermediary node performs configurations to enable data packets of a session associated with the protocol message to be transmitted from a transmitting side to a receiving side.

54. An apparatus comprising:

retrieving means for retrieving a compressing status of a protocol message to be filtered, wherein the protocol message comprises a message of a certain protocol having a header section being composed of a plurality of predefined parts, wherein said compressing status is indicative of whether the protocol message is fully compressed;

transceiver means for relaying the protocol message when the compressing status retrieved indicates that the protocol message is fully compressed;

detecting means for detecting a type of the protocol message to be filtered when the compressing status retrieved indicates that the protocol message is not fully compressed; and scanning means for scanning the protocol message to identify compressed and uncompressed predefined parts of the protocol message and to selectively process, based on the detected protocol message type and the scanning, certain ones of said predefined parts of the protocol message and leaving other ones of said predefined parts of the protocol message unprocessed.

* * * * *